United States Patent [19]

Müller et al.

[11] Patent Number: 4,880,980

[45] Date of Patent: Nov. 14, 1989

[54] INTRUSION DETECTOR

[75] Inventors: Kurt Müller, Stäfa; Hansjürg Mahler, Hombrechtikon, both of Switzerland

[73] Assignee: Cerberus AG, Switzerland

[21] Appl. No.: 230,795

[22] Filed: Aug. 10, 1988

[30] Foreign Application Priority Data

Aug. 11, 1987 [CH] Switzerland ........................ 3083/87

[51] Int. Cl.$^4$ ................................................ G01J 5/08

[52] U.S. Cl. .................................... 250/353; 250/342; 340/567

[58] Field of Search ................ 250/353, 342; 340/567, 340/600

[56] References Cited

U.S. PATENT DOCUMENTS

| | | | |
|---|---|---|---|
| 3,056,106 | 9/1962 | Hendricks | 340/31 |
| 3,466,119 | 9/1969 | Francia | 350/299 |
| 3,703,718 | 11/1972 | Berman | 340/258 |
| 3,744,885 | 7/1973 | Hurtado | 350/288 |
| 3,858,192 | 12/1974 | Fischer | 340/258 R |
| 3,886,360 | 5/1975 | Reiss et al. | 250/338 |
| 3,923,382 | 12/1975 | Harding | 350/296 |
| 3,972,598 | 8/1976 | Kunz | 350/293 |
| 3,988,726 | 8/1976 | Reiss et al. | 340/258 |
| 4,081,680 | 3/1978 | Keller | 250/342 |
| 4,179,691 | 12/1979 | Keller | 340/567 |
| 4,195,234 | 3/1980 | Berman | 307/117 |
| 4,339,748 | 7/1982 | Guscott | 340/555 |
| 4,625,115 | 11/1986 | Guscott | 250/353 |

FOREIGN PATENT DOCUMENTS

| | | |
|---|---|---|
| 0147925 | 10/1984 | European Pat. Off. . |
| 3112529 | 11/1982 | Fed. Rep. of Germany . |
| 2557716 | 12/1984 | France . |
| 2152662 | 1/1985 | United Kingdom . |

*Primary Examiner*—Janice A. Howell
*Assistant Examiner*—Richard Hanig
*Attorney, Agent, or Firm*—Brumbaugh, Graves, Donohue & Raymond

[57] ABSTRACT

An intrusion detector with a plurality of reflector segments that focus infrared energy from a corresponding plurality of detection zones onto a common sensor. Uniform coverage of a rectangular area with detection zones and detection sensitivity unaffected by distance is achieved by means of a reflector segment arrangement in which the reflector segments are mounted on supporting structures and in which the distance from the sensor and therefore the focal length of the reflector segments is substantially proportional to the detection distance. The reflector segments are staggered horizontally and vertically on the supporting structures such that the centrally positioned reflector segments are set lower and have a different shape than the laterally positioned segments, and whereby the number of reflector segments is reduced with decreasing detection distance such that the density of the detection zones is uniform throughout the retangular protected room.

12 Claims, 3 Drawing Sheets

INTRUSION DETECTOR

BACKGROUND OF THE INVENTION

The present invention concerns an intrusion detector with a sensor having at least one infrared-sensitive sensor element and several infrared reflector segments arranged on at least one supporting structure which focus infrared radiation from a number of separate detection zones on to a common sensor.

Such detectors record the presence of objects or persons, such as an intruder or burglar in a monitored room or area by detecting the infrared radiation emitted by the object or person. Since a monitored area is divided into a number of detection zones separated by neutral zones, every movement by an intruder crossing the room produces a characteristic modulation of the infrared rays which is picked up by the sensor. By means of appropriate sensors, which can comprise several sensor elements connected in a specific manner such as dual sensors, the typical modulation of a person moving through the detection zones can by means of evaluating circuits indicate the presence of an intruder and activate an alarm signal. Such intruder detectors are not only required to detect and signal the presence of intruders in a monitored area with certainty while remaining immune to any attempt to sabotage the system, but also to avoid false alarms.

For the creation of the required separated detection zones U.S. Pat. No. 3,703,718 calls for reflector segments to be arranged next to each other on a common supporting structure in two rows one above the other. As only two corresponding rows of detection zones are provided, coverage of the room to be monitored with detection zones is inadequate, so that with skill, an intruder could cross a room without being detected and signalled.

For better coverage of the protected area with detection zones, CH 591 733 or DE 26 53 111 show that reflector segments must be so designed and arranged as to create a number of beam-shaped detection zones so that a larger protection area can be monitored with the same number of reflector segments on a common supporting structure. EP 50 751, DE 27 19 191 or U.S. Pat. No. 3,923,383 also show that a number of reflector segments on a common supporting structure can be arranged in the form of a multi-facetted mirror. Although here a monitored area can be covered relatively densely with the correspondingly large number of detection zones, such arrangements are not adapted to the given shape and dimensions of a room to be protected.

However, the above-mentioned reflector segment arrangement has the disadvantage that the focal lengths of all reflector segments are the same, so that a person further away produces a smaller image on the sensor than a person near the detector. This leads to variable detector sensitivity for persons within detection zones which cover areas at varying distances from the detector. With the usual arrangement of such detectors below the ceiling of the room, sensitivity depends on the angle of inclination of the detection zone from the horizontal plane, so that, e.g. in detection zones with a steep angle of inclination covering a room area close to the detector, detection sensitivity is reduced, which in practice is usually not wanted.

EP 191 155 or U.S. Pat. No. 4,339,748 specify that adjacent reflector segments should be arranged in three rows one above the other. The focal lengths of the individual rows of reflector segments are thus varied and adapted to the respective detection distance. However, they are the same within the individual rows. For this purpose the rows of reflector segments must be arranged on several different supporting structures so that the entire reflector arrangement has a complicated shape. An arrangement of reflector segments in a few rows does not provide adequate room coverage so that such a detector is not completely sabotage-proof. As the focal length is the same within one row of reflector segments, precise modification of the detection zone pattern to the specific form and dimensions of a room or area to be monitored is normally not given.

The present invention endeavors to eliminate the acknowledged disadvantages of the prior art and especially to provide an intrusion detector as described at the outset which has improved detection sensitivity and detection reliability using a simplified design and which in particular provides better and more uniform coverage for a given room or area to be monitored with detection zones. So that the detector cannot be outwitted easily, the detection zone pattern is adapted to the shape and dimensions of the room or area to be protected and the detection sensitivity for one person in the individual detection zones is virtually independent of the detector's detection distance.

SUMMARY OF THE INVENTION

The present invention has solved the problems of the prior art devices in that the reflector segments are affixed to at least one supporting structure and staggered both in the horizontal and vertical planes in such a manner that the optical axis corresponding to each individual reflector segment has a specific horizontal and vertical displacement. Concurrently, the focal points of the reflector segments correspond to the position of the sensor as a result of the shape of the individual reflector segments and their orientation on the supporting structure. As a result of this arrangement, infrared energy from detection zones throughout the desired region of protection is focused onto the sensor. The focal lengths of the reflector segments are approximately inversely proportional to the size of the vertical angular displacement associated with the detection zone of a reflector segment.

It is advantageous if the number of reflector segments in a reflector group and/or the number of reflector groups vary with the size of the desired region of protection in order to achieve uniform room coverage with the detection zones.

It is also advantageous to design the supporting structure as an approximately paraboloid structure in the axis of which the sensor is arranged so that as the angle of incidence of radiation on the sensor increases, the distance from a reflector segment to the sensor decreases continuously. This causes the actual focal lengths of the reflector segments mounted on the supporting structure to decrease according to each segment's distance from the sensor; or in other words the actual focal length becomes shorter as the angle of incidence in the horizontal plane increases and as the detection distance becomes shorter. Therefore, the image scale remains nearly constant.

It is advantageous to shape and dimension the reflector segments, e.g., such as by increasing the size of the reflector segments whose optical axes have a smaller angle of incidence thereby rendering detection sensitivity in the detection zones practically unaffected by the range of vertical angular displacement associated with a particular segment. In other words, the size and shape of the reflector segments compensate for decreasing sensor sensitivity caused by sloping angles of incidence.

The invention is explained in more detail using the examples given in the figures. below.

DESCRIPTION OF THE PREFERRED EMBODIMENTS

Figure 1:
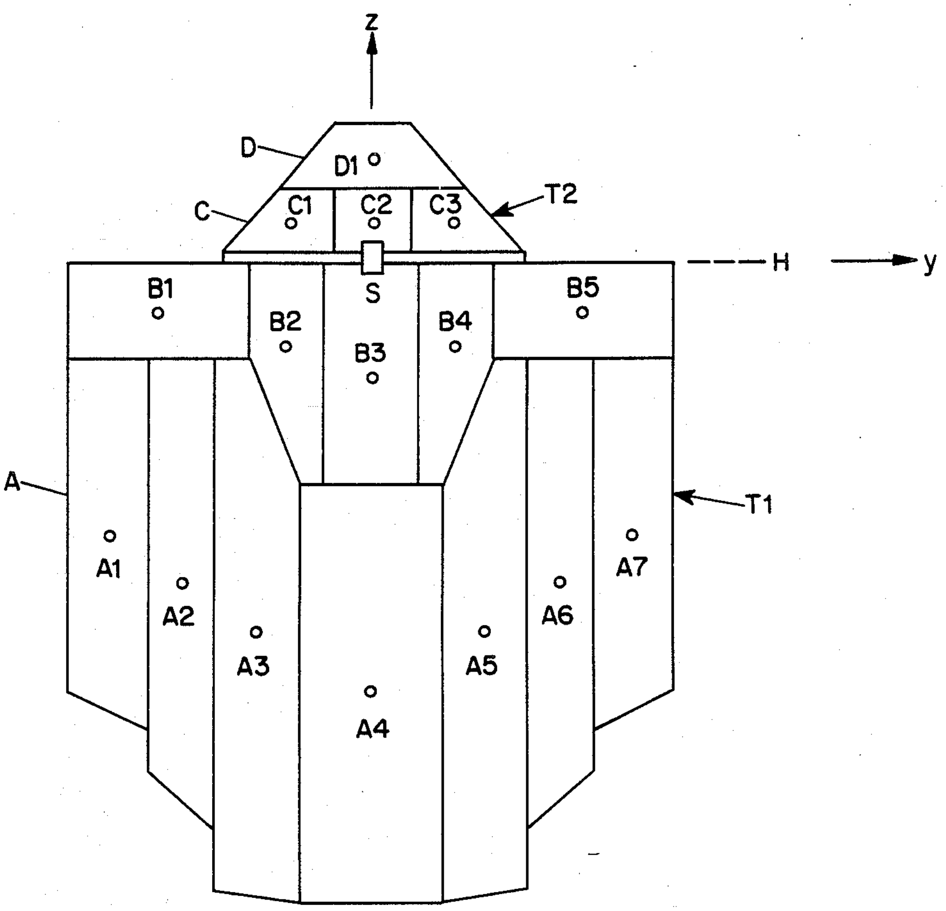
FIG. 1 is a horizontal view of the reflector arrangement of an intrusion detector.
Figure 2:
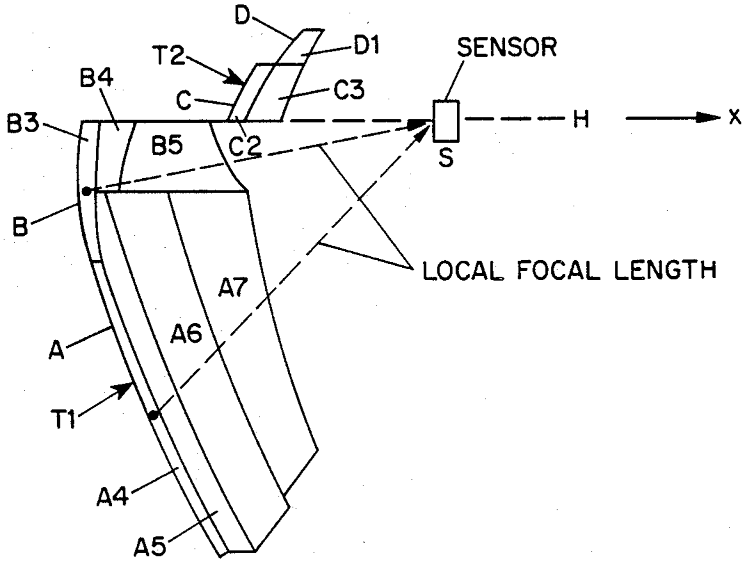
FIG. 2 is a vertical section through the reflector arrangement shown in FIG. 1, the line labelled H is approximately the axis of the paraboloid of the support structure.

In the arrangement shown in FIGS. 1 and 2, several reflector groups A–D are mounted on two supporting structures T1 and T2. The support structure consists roughly of two paraboloids. They are the result of the arrangement of the individual paraboloid mirror segments, as is described further below. The reflector segments have a reflective coating which focuses the infrared energy generated by at least one person onto sensor S. The focal point of all reflector segments coincide with the position of the common sensor S. The reflector groups A, B which are located below the horizontal H formed by the common sensor S, are mounted on the lower supporting structure T1, and the reflector groups C, D which are located above the horizontal H are mounted on the upper supporting structure T2. Reflector segments A1–A7 of the lowest group A of the supporting structure T1 are designed and arranged such that their corresponding detection zones incline least toward the horizontal, i.e. those reflector segments included in group A have the optical axes with the smallest vertical angular displacements. As a result, it is possible to detect an intruder at a greater distance, i.e. in the farthest zones. Reflector segments B1–B5 of the next highest group B incline more than the group A segments so that the group B segments correspond to medium range detection zones. Group C reflector segments C1–C3, located on the upper support structure T2, provide detection in the near zone, while the only reflector segment D1 of the uppermost zone D of the uppermost supporting structure T2 monitors the area immediately below the detector ("Look-Down-Zone"). Table 1 shows the orientation of the optical axes of the 16 paraboloids (azimuth, elevation and focal length) from which the individual reflector segments are cut (the indices are the same as used in FIG. 1).

TABLE 1

| Orientation of the 16 Paraboloids | | | | | | | |
|---|---|---|---|---|---|---|---|
| | A1 | A2 | A3 | A4 | A5 | A6 | A7 |
| Azimuth (in degrees) | 39.5 | 25.5 | 12.1 | 0 | −12.2 | −25.5 | −39.5 |
| Elevation (in degrees) | 6.5 | 6.0 | 6.0 | 5.5 | 6.0 | 6.0 | 6.5 |
| Focal Length (in mm) | 23.6 | 23.6 | 23.6 | 23.6 | 23.6 | 23.6 | 23.6 |
| | B1 | B2 | B3 | B4 | B5 | | |
| Azimuth (in degrees) | 37.5 | 25.5 | 0 | −25.5 | −37.5 | | |
| Elevation (in degrees) | 19.75 | 18.75 | 15.25 | 18.75 | 19.75 | | |
| Focal Length (in mm) | 20.80 | 21.25 | 22.20 | 21.25 | 20.80 | | |
| | C1 | C2 | C3 | | | | |
| Azimuth (in degrees) | 25.5 | 0 | −25.5 | | | | |
| Elevation (in degrees) | 47 | 37 | 47 | | | | |
| Focal Length (in mm) | 9.1 | 10.1 | 9.1 | | | | |
| | D1 | | | | | | |
| Azimuth (in degrees) | 0 | | | | | | |
| Elevation (in degrees) | 75 | | | | | | |
| Focal Length (in mm) | 7.20 | | | | | | |

The shape, especially the curvature, as well as the arrangement of the supporting structures T1 and T2 for sensor S have been chosen so that the distance from sensor S to the reflector segment positions on the supporting structures decreases with increasing angle of incidence of radiation towards the horizontal plane, i.e varies with the detection distance. In other words, the distance from a reflector segment to the sensor is inversely related to the vertical angular displacement of the optical axis of that particular reflector segment. In the ideal situation, the arrangement of the individual reflector segments would be chosen so that each focal length of a reflector segment is substantially proportional to the detection distance associated with that segment.

The arrangement of the paraboloid supporting structures with a horizontal axis has proven to be highly suitable. This arrangement automatically increases the distance of the supporting structures from the sensor as the vertical angular displacement decreases so as to cover farther detection zones.

Thus, with the example shown in FIG. 2, the reflector groups A, B which correspond to the farthest detection zones and the reflector groups C, D, allocated to the nearest detection zones are arranged on two paraboloid shaped supporting structures.

Although, as the example shows, it can be useful to arrange the reflector groups above the horizontal plane formed by the sensor and the reflector groups below the horizontal plane formed by the sensor on different supporting structures, which can be naturally combined into one mechanical unit, it is, of course, also possible for all reflector groups to be affixed to a single supporting structure, the peak cross-section of which has the more useful shape of a suitable spiral.

The individual reflector segments are best shaped as paraboloidal segments, the axes of which are parallel to the direction of the allocated detection zone, in order to ensure a good optical image even if radiation incidence strikes at an angle.

Figure 3:
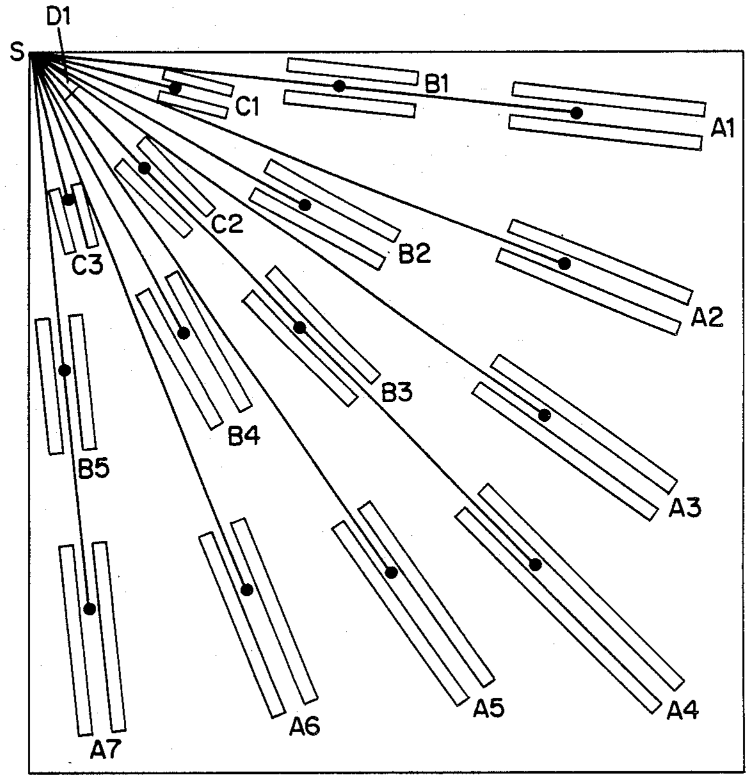
FIG. 3 is the pattern of the radiation detection zones generated by this reflector arrangement.
Figure 4:
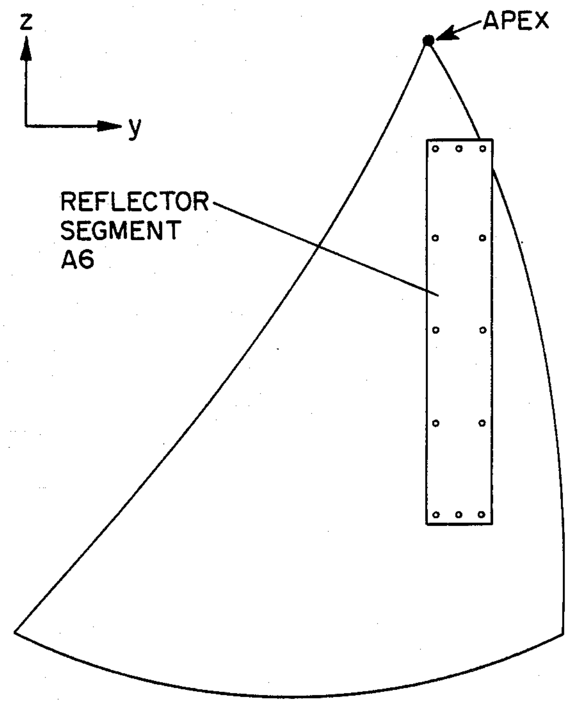
FIG. 4 shows how reflector segment A6 is cut from its corresponding individual paraboloid (one-fourth of which is shown, viewed along the line H)
Figure 5:
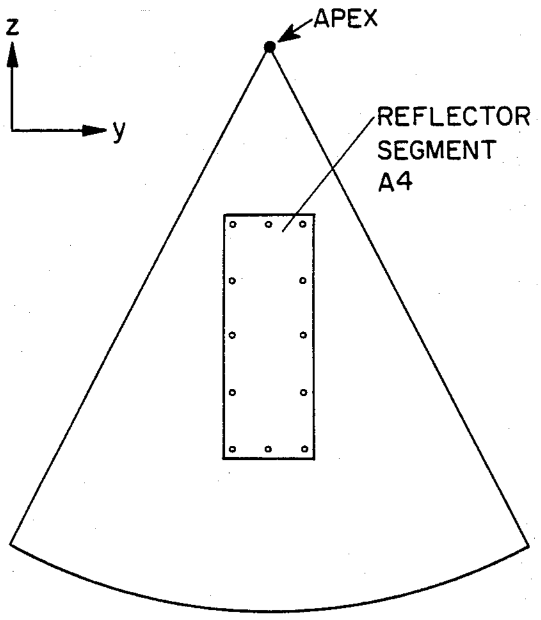
FIG. 5 shows how reflector segment A4 is cut from its corresponding individual paraboloid (one-fourth of which is shown, viewed along the line H)
Figure 6:
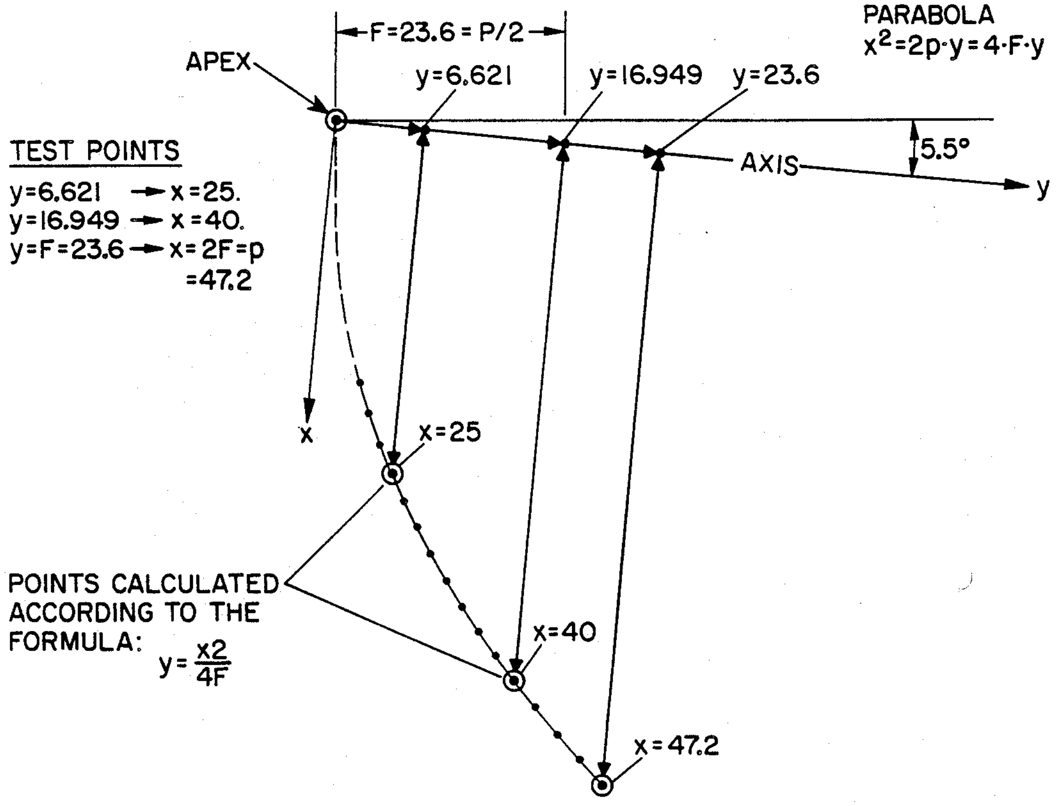
FIG. 6 shows the parabola with the corresponding formula for segment A4, the paraboloid shape of the supporting structure having an axis tilted at about 5.5°.
Figure 7:
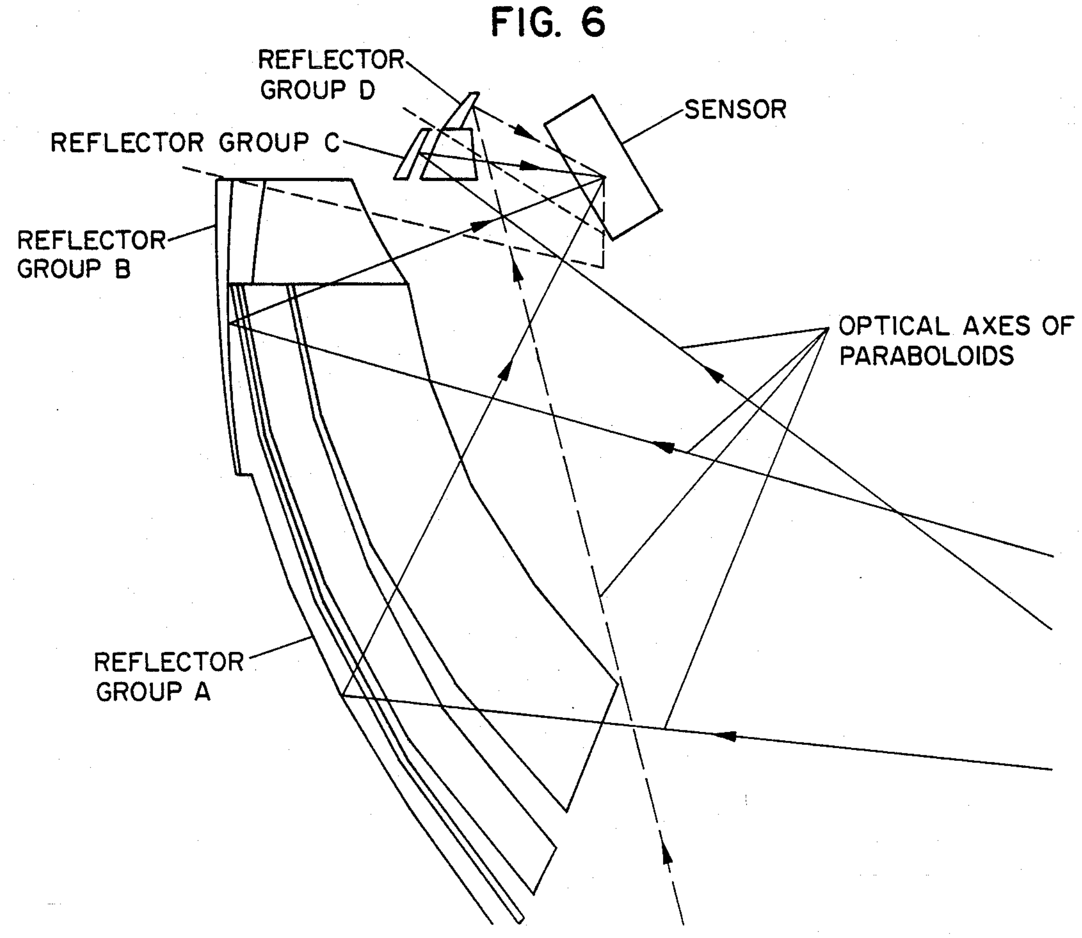
FIG. 7 is a side-view of the optics with the detector tilted 30° from vertical and with the directions of the incoming infrared radiation indicated (Optical axes of the paraboloids).

As shown in FIG. 3, apart from the advantage of approximate distance-independent detection sensitivity, a detector with the reflector segment arrangement shown in FIGS. 1 and 2 has the additional advantage that a monitored room of given dimensions can be covered more uniformly and more completely with detection zones. FIG. 3 shows an example of coverage of the detection zone of a detector according to FIGS. 1 and 2 with a corner mounting in a protected room with an area of 12 m.×12 m. and 2 m. in height. The particularly good and uniform coverage of the rectangular or square area of the room is achieved by the horizontally and vertically staggered angular displacements of the optical axes of the reflector segments. The desired displacements, in turn, result from the vertically and horizontally staggered arrangement of the apices of the reflector segments on the supporting structure. This uniform coverage was not possible with the previous reflector arrangements with simple rows of reflector segments.

A particular advantage of the arrangement of reflector segments according to the present invention is that the number of reflector segments varies according to the range of the detection zones corresponding to each reflector group A–D. For instance, in the example of the corner mounting, there are seven reflector segments A1–A7 for the reflector group A corresponding to the furthest detection zones, five reflector segments B1–B5 for the reflector group corresponding to the medium distanced detection zones, and three reflector segments C1–C3 for the reflector group C corresponding to the near detection zone. For the look down zone D, a single reflector D1 is provided. Thus, for the reflector groups associated with the longest detection distances, more detection zones are provided so that the detection zone density over the entire room is substantially uniform.

With corner-mounted detectors, it is particularly advantageous if, unlike the arrangement already mentioned with parallel rows, the centrally positioned reflector segment in each reflector group is staggered vertically, relative to the laterally positioned reflector segments of the same group. The centrally positioned reflector segments A4 and B3 have a lower optical apex than the adjacent reflector segments A3 and A5, or B2 and B4 and these in turn lie lower than the outer reflector segments A1 and A7, or B1 and B5. Table 2 shows the optical apices of all paraboloids; the coordinate system [x, y, z] is indicated in FIGS. 1 and 2, the origin of the coordinate system is located at the detector S. The apices are staggered depending on the azimuth and elevation in order to get the uniform coverage system as shown in FIG. 3.

TABLE 2

| | Apices | | |
|---|---|---|---|
| | x | y | z |
| A1 | −18.09 | −14.91 | 2.67 |
| A2 | −21.18 | −10.10 | 2.47 |
| A3 | −22.94 | −4.96 | 2.47 |
| A4 | −23.49 | 0 | 2.26 |
| A5, A6, A7 | | symmetrical in y | |
| B1 | −15.51 | −11.90 | 7.02 |
| B2 | −18.17 | −8.66 | 6.83 |
| B3 | −21.45 | 0 | 5.85 |
| B4, B5 | | symmetrical in y | |
| C1 | −5.55 | −2.65 | 6.60 |
| C2 | −8.06 | 0 | 6.07 |
| C3 | | symmetrical in y | |
| D1 | −1.86 | 0 | 6.95 |

In FIG. 2, the geometric mid-points of the reflector segments indicate the average local focal length of the individual segments used to focus infrared radiation onto the sensor S.

The range of detection zones A1, B1, etc. is smaller than that for A4, B3, etc.; therefore the corresponding local focal length has to be smaller too; that means the geometric mid-points shown in FIG. 1 have to be staggered going from A4 to A1 and A7, and from B3 to B1 and B5, respectively. The reflector segments are rectangular whenever possible with the area of said segments decreasing with the local focal length, in order to collect about the same amount of infrared energy from an intruder walking at the maximum range of every individual detection zone shown in FIG. 3. Thus, the detection zones associated with the centrally positioned segments A4 and B3 have a greater detection distance than the laterally positioned segments of the same group. With this feature, the detector is well adapted to rectangular and square rooms. The special shape of the supporting structure T1 ensures that the image scale remains unaffected by the varying distances from the sensor to the individual segments within one group as the lower arrangement of the centrally positioned segments with a somewhat greater detection distance automatically allows for a greater distance from the sensor and therefore for a greater focal length.

The arrangement of the reflector segments was designed starting with A4 and by realizing the detection coverage of FIG. 3 (i.e., having in mind to obtain the uniform coverage of the area to be supervised). The shape according to FIG. 1 was achieved as a consequence of the calculation of the optimum construction.

It will be advantageous to select a somewhat larger focal length for the centrally positioned reflector segment C2 which is slightly behind the adjacent laterally positioned reflector segments C1 and C3 and thus is adapted to the slightly larger detection distance.

As shown in the example, the sensor can be designed as a dual sensor with two sensor elements in a differential circuit so that every individual detection zone is divided into two adjacent zones which, as is known, using a special evaluating circuit, improves detection capability.

Obviously, the invention is not restricted to the example shown of a corner-mounted intrusion detector for the protection of a square room, rather it can be adapted to other shapes of rooms and types of mounting utilizing the invention concept by means of an appropriate choice of reflector segments with respect to form, curvature, alignment and fitting so that the same technical advantages can be achieved.

I claim:

1. An intrusion detector comprising at least one infrared sensor and a focusing reflector wherein said reflector comprises a plurality of reflector groups, each group having at least one reflector segment, each of said segments having a focal point at said sensor and said segments being interconnected to form a composite reflector structure each of said segments having an optical axis with a selected vertical and horizontal angular displacement, said vertical and horizontal displacements being selected to focus infrared energy from a corresponding plurality of detector zones in a desired region of protection onto said sensor, said zones being staggered in both horizontal and vertical angular displacement, each of said segments having a focal length approximately inversely proportional to the size of the vertical angular displacement of the corresponding optical axis, each of said reflector groups corresponding to a range of vertical angular displacements, the vertical angular displacements within each group being different for different horizontal angular displacements to uniformly distribute said detector zones within said desired region of protection.

2. An intrusion detector according to claim 1, wherein said horizontal and vertical angular displacements of said segments are selected such that their corresponding detection zones form a pattern so as to cover, substantially uniformly, a rectangular area.

3. An intrusion detector according to claim 1, wherein said segments are shaped and dimensioned such that the angular sizes of the segments are as viewed from said detector increased with increasing lateral position of the segments and decreasing vertical angular orientation of said optical axes, thereby rendering detection sensitivity at the sensor virtually unaffected by the angle of incidence of the infrared energy reflecting off the segments.

4. An intrusion detector according to claim 1, wherein at least one of said reflector groups comprises a centrally positioned segment and a plurality of staggered laterally positioned segments.

5. An intrusion detector according to claim 4, wherein the optical apex of each centrally positioned segment is lower than the optical apex of each immediately adjacent, laterally positioned segment, and wherein the laterally positioned segments are arranged such that the heights of their respective optical apices increase with increasing distance from the centrally positioned segment.

6. An intrusion detector according to claim 1, wherein the focal length of at least one centrally positioned segment is different from the focal length of at least one segment laterally positioned from said centrally positioned segment.

7. An intrusion detector according to claim 1, wherein the number of segments in a group varies according to the range of vertical angular displacements associated with each group.

8. An intrusion detector according to claim 7, wherein the number of segments in each group is directly proportional to the range of vertical angular displacements associated with each group.

9. An intrusion detector according to claim 1, wherein at least one said supporting structure is approximately paraboloid in shape.

10. An intrusion detector according to claim 9, wherein those groups corresponding to the detection zones farthest from said groups are affixed to the paraboloid shaped supporting structure.

11. An intrusion detector according to claim 1, wherein said supporting structures comprise one supporting structure below the imaginary horizontal plane containing the sensor and one supporting structure above said horizontal plane.

12. An intrusion detector according to claim 11, wherein the lower supporting structure is at least an approximately paraboloid shape and supports those groups corresponding to detection zones farthest from said groups; and the upper structure is at least an approximately spherical shape and supports the reflector groups corresponding to detection zones closest to said reflector groups.

* * * * *